United States Patent
Choi et al.

(10) Patent No.: US 12,241,843 B2
(45) Date of Patent: Mar. 4, 2025

(54) ELECTRODE SHEET DEFECT DETECTION SYSTEM

(71) Applicant: LG Energy Solution, Ltd., Seoul (KR)

(72) Inventors: Ee Beom Choi, Daejeon (KR); Min Su Kim, Daejeon (KR); Dong Hyeok Shin, Daejeon (KR); Jae Yong Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 106 days.

(21) Appl. No.: 17/914,608

(22) PCT Filed: Dec. 24, 2021

(86) PCT No.: PCT/KR2021/019874
§ 371 (c)(1),
(2) Date: Sep. 26, 2022

(87) PCT Pub. No.: WO2022/145905
PCT Pub. Date: Jul. 7, 2022

(65) Prior Publication Data
US 2023/0349834 A1     Nov. 2, 2023

(30) Foreign Application Priority Data
Dec. 28, 2020   (KR) .................. 10-2020-0184324

(51) Int. Cl.
*G01N 21/88* (2006.01)
*H01M 10/42* (2006.01)

(52) U.S. Cl.
CPC ..... *G01N 21/8803* (2013.01); *G01N 21/8851* (2013.01); *H01M 10/4285* (2013.01); *G01N 2021/888* (2013.01)

(58) Field of Classification Search
CPC ......... G01N 2021/888; G01N 21/8914; G01N 21/8851; G01N 21/88; G01N 21/892;
(Continued)

(56) References Cited

U.S. PATENT DOCUMENTS

2002/0154308 A1   10/2002   Uesugi et al.
2007/0052964 A1   3/2007    Uesugi et al.
(Continued)

FOREIGN PATENT DOCUMENTS

CN    102680485 A    9/2012
CN    104221187 A    12/2014
(Continued)

OTHER PUBLICATIONS

International Search Report for PCT/KR2021/019874 mailed Mar. 22, 2022. 3 pgs.
(Continued)

*Primary Examiner* — Michael P Stafira
(74) *Attorney, Agent, or Firm* — Lerner David LLP

(57) ABSTRACT

An electrode sheet inspection system includes an inspection unit configured to inspect the external state of an electrode sheet and an ink marking unit configured to mark a portion to be removed on the electrode sheet, wherein the ink marking unit is configured to adjust an ink marking range, whereby it is possible to prevent removal of a mark on a defective portion of an electrode even after a process of notching the electrode sheet. An electrode sheet inspection method using the same is also described.

15 Claims, 3 Drawing Sheets

(58) Field of Classification Search
CPC ..... G01N 2021/8427; G01N 2021/786; G01N 21/91; G01N 2021/8918; G01N 21/8803; G01N 21/89; G01N 2021/177; G01N 2021/8411; G01N 21/84; G01N 21/8901; G01N 21/894; G01N 2201/1042; G01N 2021/8861; G01N 2021/0112; G01N 21/01; G01N 21/896; G01N 21/94; G01N 2203/0017; G01N 2203/0023; G01N 25/4866; G01N 27/223; G01N 27/82; G01N 3/08; G01N 3/20; G01N 3/32; G01N 33/204; G01N 35/00584; G01N 35/0099; G01B 11/22; G01B 2210/50; G01B 3/12; G01B 11/14; G01B 11/16; G01B 11/04; G01B 11/165; G01B 2003/1012; G01B 3/1004; H01M 4/04
See application file for complete search history.

(56) References Cited

U.S. PATENT DOCUMENTS

| | | | |
|---|---|---|---|
| 2009/0086209 | A1 | 4/2009 | Uesugi et al. |
| 2015/0030935 | A1 | 1/2015 | Ukita |
| 2016/0036085 | A1 | 2/2016 | Choi et al. |

FOREIGN PATENT DOCUMENTS

| | | | | |
|---|---|---|---|---|
| CN | 105314432 | A | | 2/2016 |
| CN | 109425616 | A | | 3/2019 |
| CN | 110116566 | A | | 8/2019 |
| JP | 4456647 | B1 | * | 4/2010 |
| JP | 2013036768 | A | | 2/2013 |
| JP | 5559618 | B2 | | 7/2014 |
| JP | 5620708 | B2 | | 11/2014 |
| JP | 6078611 | B1 | * | 2/2017 |
| JP | 6103220 | B2 | | 3/2017 |
| JP | 2019106328 | A | | 6/2019 |
| JP | 2020094943 | A | * | 6/2020 |
| KR | 970003257 | U | | 1/1997 |
| KR | 200131810 | Y1 | | 2/1999 |
| KR | 20010055922 | A | | 7/2001 |
| KR | 100568973 | B1 | | 4/2006 |
| KR | 100601567 | B1 | | 7/2006 |
| KR | 20080019128 | A | | 3/2008 |
| KR | 20090049359 | A | * | 5/2009 |
| KR | 20100107596 | A | * | 10/2010 |
| KR | 20120105211 | A | | 9/2012 |
| KR | 20060027261 | A | * | 6/2020 |
| KR | 102165333 | B1 | | 10/2020 |
| WO | 2011-078229 | A1 | | 6/2011 |
| WO | WO-2017077744 | A1 | * | 5/2017 ............. G01B 11/30 |

OTHER PUBLICATIONS

Extended European Search Report including Written Opinion for Application No. 21915703.9 dated Sep. 24, 2024, pp. 1-8.
Search Report dated Jan. 6, 2025 from the Office Action for Chinese Application No. 202180022861.8 issued Jan. 9, 2025, 3 pages. (see p. 2-3, categorizing the cited references).

* cited by examiner

【FIG. 1】
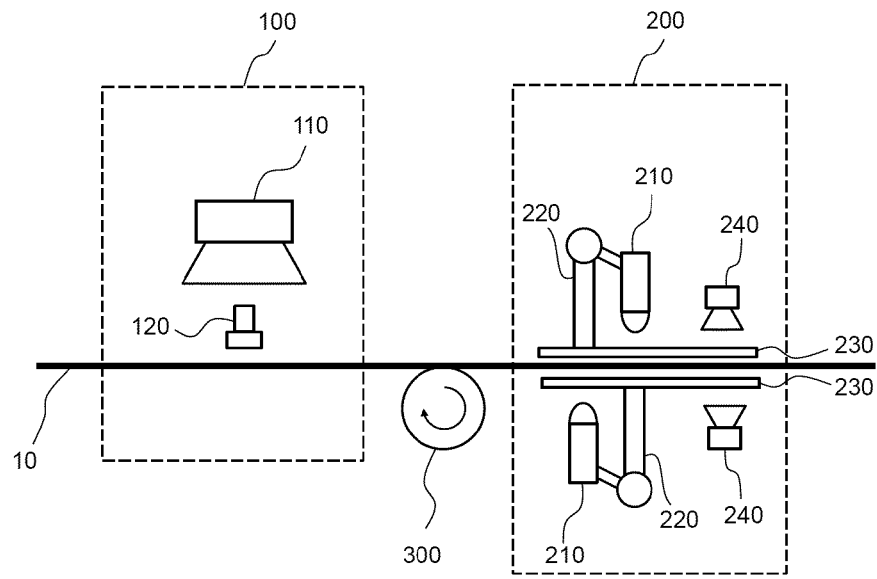
【FIG. 2】
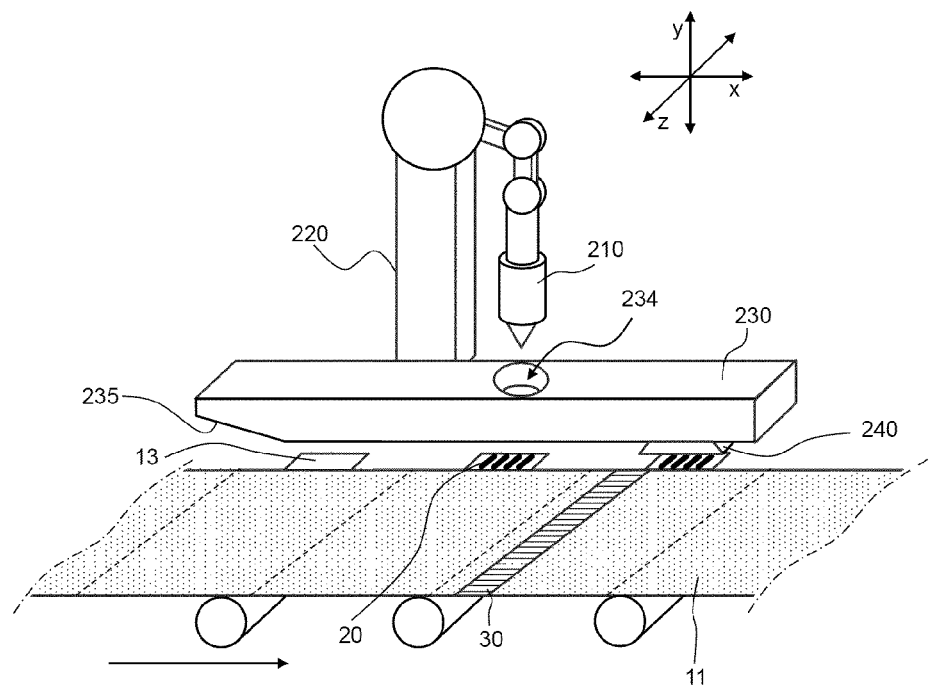

【FIG. 3】
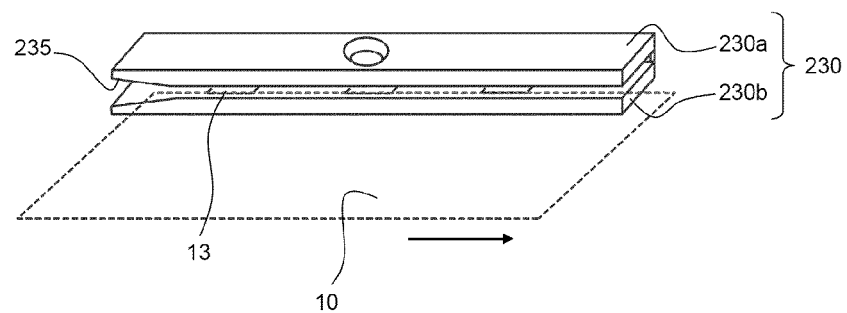
【FIG. 4】
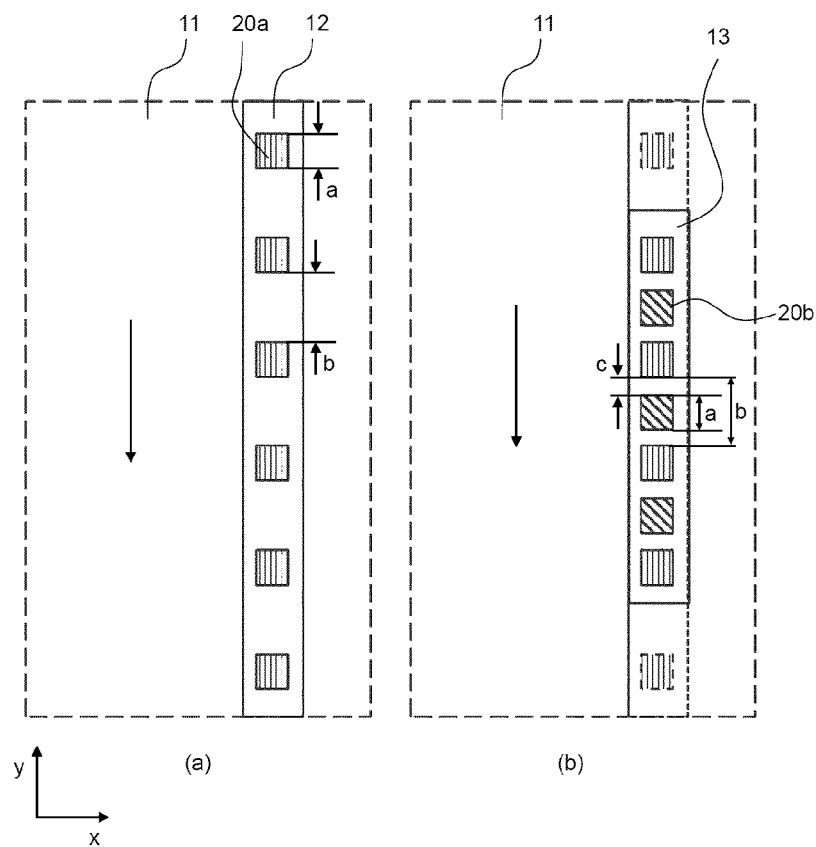

ELECTRODE SHEET DEFECT DETECTION SYSTEM

CROSS-REFERENCE TO RELATED APPLICATIONS

The present application is a national phase entry under 35 U.S.C. § 371 of the International Application No. PCT/KR2021/019874 filed on Dec. 24, 2021, which claims the benefit of priority to Korean Patent Application No. 10-2020-0184324 filed on Dec. 28, 2020, the disclosures of which are incorporated herein by reference in their entireties.

FIELD OF THE INVENTION

The present invention relates to an electrode sheet defect detection system. More particularly, the present invention relates to an electrode sheet defect detection system configured to perform ink marking in order to clearly mark a portion determined to be defective of an electrode sheet or a portion of the electrode sheet to which an electrode sheet connection tape is attached.

BACKGROUND OF THE INVENTION

A secondary battery, which is capable of being repeatedly charged and discharged, has an advantage in that lifespan of a battery cell is long, and is used in a form in which the secondary battery is detachably attached to a device or is built in a device. The kinds of devices using the secondary battery as an energy source have increased.

In particular, a lithium secondary battery, which is charged and discharged as the result of movement of lithium ions, has been used not only in the field of a small-sized battery cell, which is used for mobile devices or small-sized electronic products, but also in the field of a medium- or large-sized battery pack, which is used as an energy source of an electric vehicle or a power storage system that requires high output and high voltage, since the lithium secondary battery has advantages of high energy density and high charge voltage.

The lithium secondary battery is manufactured by receiving an electrode assembly and an electrolyte in a battery case and hermetically sealing the battery case, and the electrode assembly is formed by stacking a positive electrode and a negative electrode in the state in which a separator is interposed therebetween.

Each of the positive electrode and the negative electrode is manufactured by coating an electrode sheet with an electrode mixture, drying the electrode mixture, and slitting and notching the electrode sheet.

In a process of manufacturing each of the positive electrode and the negative electrode, foreign matter may be introduced into an electrode mixture slurry, or air bubbles may be formed in the electrode mixture slurry, whereby pinholes may be generated. Furthermore, position mismatch between electrode mixture coating layers applied to upper and lower surfaces of the electrode sheet may occur, or the width of an insulating layer formed at the interface between the electrode mixture coating layer and a non-coating layer may not be uniform.

If such a defective electrode is used, performance of a battery cell may be lowered. For this reason, defective electrodes are removed after a lamination process.

In addition, a connection tape is attached to ends of an electrode sheet and another electrode sheet in order to connect the electrode sheets to each other in a roll-to-roll process, and the portions of the electrode sheets to which the connection tape is attached are also removed after the lamination process.

Conventionally, in order to mark a defective portion of the electrode sheet, a method of attaching a tape to the defective portion is used.

In the case in which the tape is attached, however, the tape may be separated from the electrode sheet during transfer of the electrode sheet, or the tape attached to the electrode sheet in a slitting process may be removed by punching in a notching process. As a result, it is difficult to check the defective portion.

BRIEF SUMMARY OF THE INVENTION

Consequently, there is a need for a marking method capable of preventing removal of a defective portion of the electrode sheet in an electrode sheet transfer process and an electrode sheet punching process, i.e. maintaining the defective portion.

In addition, when the defective portion of the electrode sheet is marked using the tape, transfer of the electrode sheet must be interrupted, whereby process efficiency is low.

Consequently, there is a high necessity for technology capable of maintaining marking of a defective portion of the electrode sheet until a lamination process is performed without interruption of an electrode manufacturing process in order to mark the defective portion of the electrode sheet and the portion of the electrode sheet to which the connection tape is attached.

The present invention has been made in view of the above problems, and it is an object of the present invention to provide an electrode sheet defect detection system capable of marking a defect with ink and checking the mark in an electrode manufacturing process such that a defective portion of an electrode sheet is removed after manufacture of an electrode assembly.

An electrode sheet inspection system according to the present invention to accomplish the above object includes an inspection unit configured to inspect the external state of an electrode sheet and an ink marking unit configured to mark a portion to be removed on the electrode sheet, wherein the ink marking unit is configured to adjust an ink marking range.

The inspection unit may detect defects of the electrode sheet and an electrode sheet connection tape.

The ink marking unit may include a marker configured to mark the portion to be removed with ink and a driving portion configured to move the marker.

The driving portion may be configured to have a structure capable of moving the marker in three-axis directions, such as an x-axis direction, a y-axis direction, and a z-axis direction.

The ink marking unit may include a marking sensor or a vision camera configured to check an ink mark.

The ink marking unit may further include a tab guide configured to prevent damage to an electrode tab when the electrode sheet is moved.

A marker, a driving portion, a guide, and a marking sensor may be disposed at least one of above and under the electrode sheet.

The ink marking unit may mark a non-coating portion of the electrode sheet.

The marker may mark the portion to be removed on the electrode sheet during transfer of the electrode sheet.

The electrode sheet may be an electrode sheet having no electrode tab formed thereon or an electrode sheet having an electrode tab formed thereon.

In addition, the present invention provides an electrode sheet inspection method using the electrode sheet inspection system. Specifically, the electrode sheet inspection method includes (a) a first inspection step of inspecting the appearance of an electrode sheet, (b) an ink marking step of marking a portion to be removed on the electrode sheet, and (c) a second inspection step of inspecting the mark formed in the ink marking step, wherein step (a) and step (b) are performed in at least one of a step of slitting the electrode sheet and a step of notching the electrode sheet.

The ink marking step may be performed during transfer of the electrode sheet.

As is apparent from the above description, an electrode sheet defect detection system according to the present invention marks defects on an electrode sheet using an ink marking method, whereby it is possible to solve a conventional problem in that a tape attached to mark defects is removed in an electrode sheet transfer process or an electrode sheet punching process.

In addition, a defect marking range may be narrowly or widely adjusted, whereby a mark formed in an electrode sheet slitting process may be checked even after a notching process.

In addition, a marking range may be adjusted by controlling an ink marking unit, whereby application to variously sized electrodes and electrode tabs is possible.

In addition, a defective electrode may be marked and a mark formed on the defective electrode may be checked while an electrode manufacturing process is not interrupted, whereby it is possible to automate the electrode manufacturing process, and therefore it is possible to manufacture electrodes having uniform quality while improving productivity.

Since the defective electrode may be removed in advance in a production process, as described above, it is possible to prevent degradation in performance of a battery cell due to the defective electrode.

BRIEF DESCRIPTION OF THE DRAWINGS

FIG. 1 is a schematic view illustrating an electrode sheet inspection system according to the present invention.

FIG. 2 is a partial perspective view of the electrode sheet inspection system of FIG. 1.

FIG. 3 is a perspective view of a tab guide.

FIGS. 4(*a*) and (*b*) are plan views showing ink marking in a slitting process and ink marking in a notching process.

Figure 5:
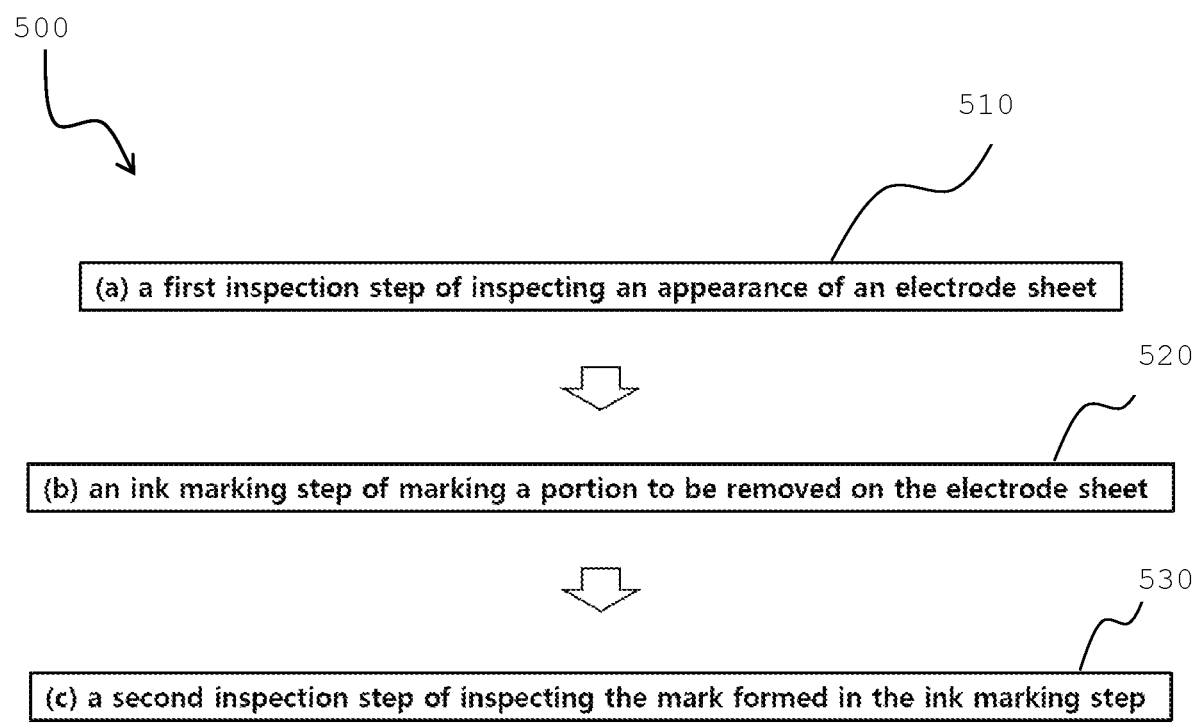
FIG. 5 is a flow chart illustrating the steps of a method according to an aspect of the invention.

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

In general, a process of manufacturing an electrode used in an electrode assembly for lithium secondary batteries may include a process of coating one surface or opposite surfaces of an electrode sheet with an electrode mixture, a process of slitting the electrode sheet, a notching process to form an electrode tab, and a process of cutting the electrode sheet into a unit electrode and laminating the unit electrode with a separator.

In the process of coating the electrode sheet with the electrode mixture, poor coating or defects, such as position mismatch between coating layers formed on the opposite surfaces of the electrode sheet, may occur. In the process of slitting the electrode sheet, whether the electrode sheet is defective may be checked, and the portion of the electrode sheet determined to be defective may be marked with ink such that the defective portion can be removed afterwards.

Also, in the notching process to form the electrode tab, whether the electrode sheet is defective may be checked, and the portion of the electrode sheet determined to be defective may be marked with ink such that the defective portion can be removed afterwards.

In the electrode manufacturing process, a process of unwinding the electrode sheet from an electrode roll, a process of winding the electrode sheet, and a process necessary for the electrode sheet may be performed as a roll-to-roll process, wherein a process of stopping transfer of the electrode sheet may be maximally reduced in the electrode manufacturing process, whereby productivity may be improved.

When an electrode is defective and removal thereof is necessary, therefore, ink may be sprayed onto the defective portion of the electrode in order to mark the defective portion, as in the present invention, wherein it is possible to mark the defective portion in the state in which transfer of the electrode sheet is not interrupted.

In addition, an electrode sheet inspection system according to the present invention is configured such that an ink marking range is adjustable.

For example, a plurality of unit electrodes may be defective, or an ink mark on the defective portion may be removed in the notching process, whereby it may be difficult to check the defective portion after the notching process. In this case, the length of the ink mark may be increased in order to check the ink mark on the electrode tab formed after notching.

Also, the ink mark formed in the process of slitting the electrode sheet and the ink mark formed in the notching process may overlap each other. Consequently, a method of changing colors or sizes of the ink marks formed in the respective processes or a method of changing the positions of the ink marks parallel to a moving direction of the electrode sheet may be used in order to distinguish therebetween.

In a concrete example, in the process of manufacturing the electrode through the roll-to-roll process, a connection tape may be attached to one electrode roll and another electrode roll in order to connect the electrode rolls to each other.

The portion of the electrode roll to which the connection tape is attached cannot be used as the electrode. An ink mark may also be formed on the portion of the electrode roll to which the connection tape is attached such that the portion of the electrode roll can be removed afterwards.

The electrode coating layer formed on one surface or opposite surfaces of the electrode sheet is not formed on the portion of the electrode sheet at which the electrode tab is to be formed. That is, a coating portion and a non-coating portion are formed on the electrode sheet, and the ink mark is formed on the non-coating portion.

In addition, the connection tape is also attached to the non-coating portion, and the connection tape may be removed in the notching process. As a result, it may be difficult to check the position of the non-coating portion at which the connection tape was attached after the notching process. For this reason, a process of removing the connection tape attached to the non-coating portion and attaching the connection tape to the coating portion may be performed before the electrode sheet enters the notching process. Consequently, it is possible to check the connection tape attached to the coating portion even after notching of the non-coating portion.

When the coating portion and the non-coating portion are formed on opposite surfaces of the electrode sheet, an ink marking unit may be disposed at each of the opposite surfaces of the electrode sheet in order to mark defects of the coating portions on the opposite surfaces of the electrode sheet.

The ink marking unit may include a marker configured to perform marking with ink and a driving portion configured to move the marker. That is, the marker is movable by the driving portion in three-axis directions, i.e. an x-axis direction, a y-axis direction, and a z-axis direction. The marker may set the size and position of a mark, and may perform correction when the size and position of the mark are changed during movement of the electrode. The electrode sheet inspection system according to the present invention includes a marking sensor or a vision camera configured to check an ink mark. The marking sensor or the vision camera may be disposed adjacent to the marker in order to check whether a mark is appropriately formed within a predetermined range almost in real time.

In addition, the electrode sheet inspection system according to the present invention may include a tab guide configured to prevent damage to the electrode tab.

When the electrode sheet is notched and the electrode tab is formed, the electrode tab may be easily bent or folded in a process of transferring the electrode sheet.

When the electrode tab is bent or folded, it may not be possible to check the ink-marked portion to be removed, or when the electrode tab is not flat and thus a shadow is formed on the electrode tab, the electrode tab may be incorrectly determined as the portion to be removed.

In order to prevent this problem, the electrode sheet inspection system according to the present invention includes the tab guide. Folding or bending of the electrode tab may be prevented by the tab guide disposed above or under the portion through which the electrode tab passes.

Hereinafter, the present invention will be described with reference to the accompanying drawings. The accompanying drawings are provided only for easier understanding of the present invention and should not be construed as limiting the scope of the present invention.

FIG. 1 is a schematic view illustrating an electrode sheet inspection system according to the present invention.

Referring to FIG. 1, the electrode sheet inspection system according to the present invention includes an inspection unit 100, in which an inspection device 110 configured to inspect the external state of an electrode sheet 10 is disposed, and an ink marking unit 200 configured to mark a portion to be removed on the electrode sheet 10.

In FIG. 1, only one inspection device is shown. In the present invention, however, one or more inspection devices may be provided. For example, the inspection device may be disposed at each of an upper surface and a lower surface of the electrode sheet.

The electrode sheet 10 is configured to have a structure in which a coating portion coated with an electrode mixture and a non-coating portion are formed on each of the upper surface and a lower surface of the electrode sheet. In a process of transferring the electrode sheet using a transfer roll 300, whether the electrode sheet is defective may be inspected, and the portion of the electrode sheet determined to be defective may be marked with ink.

Consequently, the portion to be removed may be marked in the state in which the electrode sheet is transferred, and therefore transfer of the electrode sheet may not be interrupted.

The inspection device 110 disposed in the inspection unit 100 may be a vision device, which may check whether the appearance of the electrode sheet transferred through the transfer roll 300 is defective in real time. In addition, a connection tape sensor 120 may be disposed in the inspection unit 100. The portion of the electrode sheet to which a connection tape, configured to connect one electrode roll and another electrode roll to each other, is attached may not be used as an electrode even after the connection tape is removed. The connection tape sensor 120 may detect the portion of the electrode sheet to which the connection tape is attached so as to be marked with ink.

The ink marking unit 200 is configured to adjust an ink marking range. Since the portion that is removed in the notching process cannot be specified in the slitting process or in the process before notching, setting may be performed such that an ink mark is formed over a sufficiently long range, whereby it is possible to check the ink mark on the non-coating portion that is not removed in the notching process.

The ink marking unit 200 may perform ink marking on the defective portion detected by the inspection unit 100 and the non-coating portion of the portion to which the connection tape is attached, whereby it is possible to easily check the portion to be removed on which the ink mark is formed.

The ink marking unit 200 includes a marker 210 configured to mark a portion to be removed with ink and a driving portion 220 configured to move the marker 210. The marker may mark a portion to be removed by spraying ink, and the portion to be removed may be formed so as to be easily checked with the naked eye.

The ink marking unit 200 includes a marking sensor or a vision camera 240 configured to check whether ink marking has been appropriately performed according to a set value. The marking sensor or the vision camera 240 may be disposed adjacent to the marker, whereby it is possible to check the state of ink marking in real time.

The ink marking unit 200 includes a tab guide 230 configured to prevent damage to an electrode tab when the electrode sheet 10 is moved. Consequently, it is possible to prevent folding or bending of the electrode tab in a process of forming ink marks on the electrode tab or in a checking process using the marking sensor or the vision camera.

A coating portion and a non-coating portion are formed on opposite surfaces of the electrode sheet 10, and the opposite surfaces of the electrode sheet may be defective. Consequently, the ink marking unit 200 may be disposed above and under the electrode sheet 10, or the ink marking unit 200 may be disposed above the electrode sheet or under the electrode sheet. The ink marking unit 200 may include a marker 210, a driving portion 220, a tab guide 230, and a marking sensor 240.

Specifically, the ink marking unit disposed above the electrode sheet may include a first marker, a first driving portion, a first guide, and a first marking sensor, and the ink marking unit disposed under the electrode sheet may include a second marker, a second driving portion, a second guide, and a second marking sensor.

As illustrated in FIG. 5, an electrode sheet inspection method 500 using the electrode sheet inspection system according to the present invention may include (a) a first inspection step of inspecting the appearance of an electrode sheet, (at 510) (b) an ink marking step of marking a portion to be removed on the electrode sheet, (at 520) and (c) a second inspection step of inspecting the mark formed in the ink marking step, (at 530) wherein step (a) and step (b) may be performed in at least one of a step of slitting the electrode sheet and a step of notching the electrode sheet.

That is, in the ink marking step, the portion to be removed may be marked on the electrode sheet using the marker during transfer of the electrode sheet. In the step of slitting the electrode sheet, an ink mark may be formed on the non-coating portion of the electrode sheet in which no electrode tab is formed. In the step of notching the electrode sheet, an ink mark may be formed on the non-coating portion of the electrode sheet in which the electrode tab is formed.

FIG. 2 is a partial perspective view of the electrode sheet inspection system of FIG. 1.

Referring to FIG. 2, an electrode sheet is configured such that electrode tabs 13 are formed so as to extend from one end of a coating portion 11, and the electrode sheet after notching is performed is shown.

In FIG. 2, only the marker 210, the driving portion 220, the tab guide 230, and the marking sensor 240 located above the electrode sheet are shown, and the ink marking unit located under the electrode sheet is omitted.

A connection tape 30 is attached to the coating portion 11, and ink marks 20 are formed on an electrode tab 13 of an electrode to which the connection tape 30 is attached and an electrode tab 13 of an electrode adjacent thereto.

That is, an ink marking range may be adjusted such that the ink marks can be checked on at least two electrode tabs located on the left and right sides of the connection tape after the electrode tabs are formed.

The ink marking range shown in FIG. 2 is merely an example. Depending on the type of defects, an ink mark may be formed on only one electrode tab, or ink marks may be formed on three or more electrode tabs.

The driving portion 220 may adjust the position of the marker 210 in the x-axis direction, the y-axis direction, and the z-axis direction. The driving portion 220 may also adjust the position of the tab guide 230. The marker 210 and the tab guide 230 may be moved together by the driving portion 220.

The marking sensor or the vision camera 240 may be attached to the tab guide 230. The marking sensor or the vision camera may be attached to a lower surface of the tab guide 230 so as to face the electrode sheet in order to check the ink marks 20 formed on the non-coating portion and the electrode tab 13 of the electrode sheet during movement of the electrode sheet.

The electrode tab 13 must be protected by the tab guide 230 such that deformation of the electrode tab is prevented, and at the same time the ink mark 20 must be formed on the electrode tab. For this reason, an insertion hole 234, through which the marker 210 is capable of being inserted, may be formed in the tab guide 230. The marker 210 may spray ink in a state of being inserted through the insertion hole 234 in order to form an ink mark.

FIG. 3 is a perspective view of the tab guide.

Referring to FIG. 3, the tab guide 230 includes a tab guide 230a located above the electrode sheet 10 and a tab guide 230b located under the electrode sheet 10.

In FIG. 3, the tab guide 230a and the tab guide 230b are shown as being spaced apart from each other by a predetermined distance, which shows that tab guides are disposed above and under the electrode tab 13. Actually, the distance between the tab guides may be formed so as to correspond to the thickness of the electrode sheet 10. Alternatively, the distance between the tab guides may be adjusted, as needed.

When the electrode sheet is transferred in a direction indicated by an arrow, the tab guide 230 may serve to guide the electrode tab 13, which is transferred to the ink marking unit, so as to be flat. An inclined portion 235 configured to decrease the distance between the tab guide and the electrode tab when the electrode tab is introduced may be formed at the end of the tab guide into which the electrode tab is introduced.

However, the shape of the tab guide shown in FIG. 3 is merely an example, and the tab guide may be modified so as to have variable shapes as long as it is possible to guide the electrode tab such that bending and deformation of the electrode tab are prevented.

FIGS. 4(a) and (b) are plan views showing ink marking in the slitting process and ink marking in the notching process.

FIG. 4(a) is a partial plan view of an electrode sheet having ink marks 20a formed on a non-coating portion 12 thereof in the slitting process, and FIG. 4(b) is a partial plan view of an electrode sheet having ink marks 20b formed on an electrode tab 13 thereof after the slitting process and the notching process.

In FIG. 4(b), the ink marks 20b formed on the notched electrode tab are shown as not overlapping the ink marks 20a. Unlike this, the ink marks 20b may be formed so as to completely overlap the ink marks 20a, or only some of the ink marks may overlap each other.

In a step of removing a defective electrode, the width of each of the ink marks and the distance between the ink marks may be adjusted such that the ink marks 20a and the ink marks 20b do not overlap each other, whereby the ink marks 20a and the ink marks 20b are distinguished from each other. For example, it is preferable for the width a of each of the ink marks 20a to be set to a width recognizable by the marking sensor. On the assumption that a first ink marking interval, which is the distance between the ink marks 20a, is b, b-a may be set so as to be greater than 2 mm.

At this time, a second ink marking interval c, which is the distance between the ink mark 20a and the ink mark 20b, may be set so as to be greater than 1 mm.

Alternatively, when the positions of the ink mark 20a and the ink mark 20b completely coincide with each other in the y-axis direction, the colors of the ink mark 20a and the ink mark 20b may be changed so as to be different from each other such that the overlap portion therebetween has a mixed color in order to distinguish therebetween. Alternatively, the ink mark 20a and the ink mark 20b may be formed so as to be at least partially biased from each other in the x-axis direction such that the ink marks can be distinguished from each other.

Alternatively, as shown in FIGS. 4(a) and (b), the ink mark formed in the slitting process and the ink mark formed on the electrode tab after the notching process may be distinguished from each other in a defect detection process even though the ink marks completely overlap each other, which may be within the scope of the present invention.

Also, in FIGS. 4(a) and (b), each of the ink mark 20a and the ink mark 20b is shown as having a quadrangular shape. However, the size or the shape of the ink mark is not particularly restricted as long as the ink mark is formed in the non-coating portion 12. For example, the shape of each of the ink mark 20a and the ink mark 20b may be a circle, a polygon, an oval, a slit checked pattern, a comb pattern, or a barcode. Alternatively, a plurality of identical or different patterns may be continuously formed. In the present invention, as described above, a defective portion of an electrode sheet is marked using an ink marking method, whereby it is possible to stably mark a portion to be removed. In addition, ink marks are checked in real time using the marking sensor, and deformation of an electrode tab is prevented, whereby it is possible to improve reliability of the marking sensor.

Those skilled in the art to which the present invention pertains will appreciate that various applications and modifications are possible within the category of the present invention based on the above description.

DESCRIPTION OF REFERENCE SYMBOLS

10: Electrode sheet
11: Coating portion
12: Non-coating portion
13: Electrode tab
20, 20a, 20b: Ink marks
30: Connection tape
100: Inspection unit
110: Inspection device
120: Connection tape sensor
200: Ink marking unit
210: Marker
220: Driving portion
230, 230a, 230b: Tab guides
234: Insertion hole
235: Inclined portion
240: Marking sensor or vision camera
300: Transfer roll
a: Width of ink mark
b: First ink marking interval
c: Second ink marking interval As is apparent from the above description, an electrode sheet defect detection system according to the present invention marks defects on an electrode sheet using an ink marking method, whereby it is possible to solve a conventional problem in that a tape attached to mark defects is removed in an electrode sheet transfer process or an electrode sheet punching process.

In addition, a defect marking range may be narrowly or widely adjusted, whereby a mark formed in an electrode sheet slitting process may be checked even after a notching process.

In addition, a marking range may be adjusted by controlling an ink marking unit, whereby application to variously sized electrodes and electrode tabs is possible.

In addition, a defective electrode may be marked and a mark formed on the defective electrode may be checked while an electrode manufacturing process is not interrupted, whereby it is possible to automate the electrode manufacturing process, and therefore it is possible to manufacture electrodes having uniform quality while improving productivity.

Since the defective electrode may be removed in advance in a production process, as described above, it is possible to prevent degradation in performance of a battery cell due to the defective electrode.

The invention claimed is:

1. An electrode sheet inspection system comprising:
    an inspection unit configured to inspect an external state of an electrode sheet; and
    an ink marking unit configured to mark a portion to be removed on the electrode sheet, the ink marking unit comprising a tab guide configured to prevent damage to an electrode tab when the electrode sheet is moved,
    wherein the ink marking unit is configured to adjust an ink marking range.

2. The electrode sheet inspection system according to claim 1, wherein the inspection unit is configured to detect defects of the electrode sheet and an electrode sheet connection tape.

3. The electrode sheet inspection system according to claim 1, wherein the ink marking unit comprises:
    a marker configured to mark the portion to be removed with ink; and
    a driving portion configured to move the marker.

4. The electrode sheet inspection system according to claim 3, wherein the driving portion is configured to have a structure configured to move the marker in three-axis directions, an x-axis direction, a y-axis direction, and a z-axis direction.

5. The electrode sheet inspection system according to claim 1, wherein the ink marking unit comprises a marking sensor or a vision camera configured to check an ink mark.

6. The electrode sheet inspection system according to claim 1, wherein a marker, a driving portion, a tab guide, and a marking sensor are disposed at least one of above and under the electrode sheet.

7. The electrode sheet inspection system according to claim 1, wherein the ink marking unit is configured to mark a non-coating portion of the electrode sheet.

8. The electrode sheet inspection system according to claim 3, wherein the marker is configured to mark the portion to be removed on the electrode sheet during transfer of the electrode sheet.

9. The electrode sheet inspection system according to claim 1, wherein the electrode sheet is an electrode sheet having no electrode tab formed thereon or an electrode sheet having an electrode tab formed thereon.

10. An electrode sheet inspection method using the electrode sheet inspection system according to claim 1, the electrode sheet inspection method comprising:
    (a) a first inspection step of inspecting an appearance of an electrode sheet;

(b) an ink marking step of marking a portion to be removed on the electrode sheet; and (c) a second inspection step of inspecting the mark formed in the ink marking step, wherein step (a) and step (b) are performed in at least one of a step of slitting the electrode sheet and a step of notching the electrode sheet.

11. The electrode sheet inspection method according to claim 10, wherein the ink marking step is performed during transfer of the electrode sheet.

12. The electrode sheet inspection system according to claim 3, wherein the driving portion is configured to adjust the position of the tab guide.

13. The electrode sheet inspection system according to claim 3, wherein the driving portion is configured to adjust the position of the marker and the tab guide together.

14. The electrode sheet inspection system according to claim 3, wherein the tab guide comprises an insertion hole, wherein the marker is configured to be inserted through the insertion hole.

15. The electrode sheet inspection system according to claim 1, wherein the tab guide comprises a first tab guide located above the electrode sheet and a second tab guide located under the electrode sheet.

* * * * *